United States Patent

Boscarino et al.

Patent Number: 5,735,649
Date of Patent: Apr. 7, 1998

[54] MACHINE TOOL CUTTER POSITION ADJUSTMENT DEVICE

[75] Inventors: William Boscarino, Des Plaines; Klaus Lohner, Elgin; John E. Burley, Hanover Park, all of Ill.

[73] Assignee: Kaiser Precision Tooling, Inc., Elk Grove Village, Ill.

[21] Appl. No.: 727,012

[22] Filed: Oct. 8, 1996

[51] Int. Cl.[6] ................................ B23B 27/16
[52] U.S. Cl. ............... 408/153; 407/39; 407/44; 408/173; 408/190
[58] Field of Search ................. 408/153, 173, 408/181, 190, 224; 407/39, 38, 44, 79

[56] References Cited

U.S. PATENT DOCUMENTS

| | | |
|---|---|---|
| 402,394 | 4/1889 | Brown . |
| 466,869 | 1/1892 | Gerdom . |
| 1,109,321 | 9/1914 | Charles . |
| 1,724,497 | 8/1929 | Mehl . |
| 3,295,187 | 1/1967 | Plummer . |
| 3,343,431 | 9/1967 | Boyer . |
| 3,542,528 | 11/1970 | Bech ....................... 408/153 |
| 4,318,647 | 3/1982 | Erkfritz . |
| 4,398,854 | 8/1983 | Pape et al. ................ 408/181 |
| 4,611,959 | 9/1986 | Kress et al. . |
| 4,621,957 | 11/1986 | Dillard et al. . |
| 5,054,970 | 10/1991 | Steiner . |
| 5,316,417 | 5/1994 | Romi . |
| 5,320,458 | 6/1994 | Reiterman et al. ......... 407/44 |
| 5,328,307 | 7/1994 | Fees et al. ............... 408/173 |
| 5,396,693 | 3/1995 | Lohner . |

FOREIGN PATENT DOCUMENTS

| | | | |
|---|---|---|---|
| 410014 | 1/1991 | European Pat. Off. | 408/173 |
| 705048 | 3/1954 | Germany | 408/153 |

*Primary Examiner*—Daniel W. Howell
*Assistant Examiner*—Adesh Bhargava
*Attorney, Agent, or Firm*—Schiff Hardin & Waite

[57] ABSTRACT

The invention is an apparatus for adjusting the position of a cutter cartridge mounted on a machine tool head using noncircular adjustment pins that provide full linear contact between the machine tool head and the cutter cartridge.

13 Claims, 5 Drawing Sheets

MACHINE TOOL CUTTER POSITION ADJUSTMENT DEVICE

BACKGROUND OF THE INVENTION

This invention provides a new and improved apparatus for adjusting a machine tool cutting cartridge. This apparatus provides a more stable cartridge that can withstand the overall forces associated with high-speed rotational cutting devices better than conventional cartridges.

Conventional cutter cartridges experience many problems when subjected to high-speed production requirements and/ or high rotational machining speeds. Specifically, adjustment mechanisms on conventional cutter cartridges provide for point-like contact between the adjustment mechanism and the machine tool head. These adjustment mechanisms typically adjust the position of the cutter at the point of contact. Forces exerted on the cutter cartridge are concentrated at this point, and cause the cartridge and/or the associated cutting element to vibrate, dislocate, and/or fail. The machine tool head also may be indented at this single point of contact, causing the machine tool head to dislocate at this point and compromising the integrity of the tool head.

Many high-speed machining devices use detachable cutter cartridges. These cutter cartridges typically contain a cutting element and at least a portion of an adjustment mechanism. The cutter cartridge is inserted into a recess in the head of the machine tool. The cartridge then is adjusted to the desired cutting position and secured to the machine head.

Single point-like contact can be seen in various arrangements disclosed in the prior art. This contact occurs between the edge of a disk and an abutting edge of a cutter element (as shown in Brown, U.S. Pat. No. 402,394); between the leading edge of a screw and a recess in the cutter element (as shown in Mehl, U.S. Pat. No. 1,724,497); or between the underside of the head of a screw and a recess in the cutter element (as shown in Charles, U.S. Pat. No. 1,109,321).

Such arrangements subject the entire cutter cartridge to forces which increase the chance for vibrations, dislocations, indentations, or early fracture. A recent illustrative example of point-like contact is disclosed in Kress, U.S. Pat. No. 4,611,959. Kress discloses an adjustment screw that can be rotated to displace an adjustment member, and, in turn, a cutter cartridge mounted to a machine tool head. Thus, the contact between the relatively large cutter cartridge and the adjustment mechanism occurs solely at the interface point between the adjustment mechanism and the machine tool head. This interface is no larger than the leading edge of the screw. The forces are concentrated at this point, rather than distributed over a multitude of points.

Machine tool operators have avoided these problems in the past by slowing down the rotational speed of the machining device, slowing down the feed rate of the piece being machined, or both. These corrective actions, however, increased the costs associated with producing machine finished-articles. To overcome such obstacles to accurate machining, productivity, and cost, the machining industry has sought to increase the stability of the interface between the machine tool head and the apparatus used to adjust and secure the position of a cutter cartridge.

The development of more complex machining processes, in which the cutting element is positioned further from the axis of rotation of the machine tool, has further exacerbated these problems. In such increasingly distal positions, the cutting element experiences relatively higher torsional forces. This has enhanced the need to provide an adjustment mechanism that reduces the effects of these forces and stabilizes the cutting element during the machining process.

Another disadvantage of these adjustment mechanisms is that they are located in an inaccessible position on the cutter cartridge or machine tool head. For example, in order to reach many adjustment mechanisms, the operator must approach the cartridge or tool head from either its side or the bottom. Without direct access to the adjustment mechanism, there is an increased possibility of inaccurate adjustments. In addition, these inaccessible locations cause machine tool operators to spend extra time adjusting the cutting element to the desired location, decreasing productivity. An illustrative example of such an arrangement is Steiner, U.S. Pat. No. 5,054,970. Steiner discloses two oppositely facing coaxial adjustment screws. Access to the adjustment screws is only found at diametrically opposed positions on the sides of the tool head. It is impossible to view both adjustment screws at the same time. It is also impossible to view both the adjustment screw and the cutting element at the same time. The operator must exercise great care to ensure that adjustments are precisely completed.

The machine tool industry thus desires an adjustment mechanism that is both accessible to the operator and easy to use. Moreover, where adjustment mechanisms exist for adjustment in two or more directions, it is beneficial for the operator to be able to easily move between the adjustment mechanisms for the separate directions. Thus, there is a need for a cartridge that has both its adjustment mechanisms and locking mechanism in the same easily accessed position.

Conventional cutter cartridge mechanisms also reveal several deficiencies in the positioning of the locking mechanism used to secure the cartridge to the machine tool head. These cutter cartridges use locking mechanisms that are substantially removed from the location of the adjustment mechanisms. The primary reason for removing the locking mechanism from the adjusting mechanism was the above described problem of placing the adjustment mechanism in an inaccessible location. This allowed manufacturers of cutter cartridges to place the locking mechanism in an easily accessible location. Kress is again illustrative of such a of device. The adjustment mechanism is partially removed from the cutter cartridge in that the adjustment screw is only accessible through the head of the machine tool. The locking mechanism, however, is located directly on the cartridge and relatively close to the actual cutting element. The physical separation of these two vital interfaces between the cartridge and the machine tool head increases the possibility that vibrations, dislocations, and/or early failure will occur. It has thus become necessary to locate not only the adjustment mechanisms in an easily accessible location, but also to locate the locking mechanism in a relatively close position to the adjustment mechanisms.

SUMMARY OF THE INVENTION

To overcome the problems described above, there is provided a cutter adjustment mechanism for a machine tool, comprising a tool head having a recess at least partly defined by at least one planar wall and at least one means for cutting. The means for cutting has at least one edge abutting a planar wall of the recess, adapted to be removably nested in the recess. A means for adjusting the position of the cutting means relative to the planar wall, having a non-circular cross-section, also is provided so that the surface of the means for adjusting tangentially contacts the planar wall and biases the cutting means toward or from the planar wall as the means for adjusting is rotated.

It is an object of the invention to stabilize and strengthen the interface between the cutter cartridge to the machine tool head to reduce the concentration of forces that are applied to the cutter cartridge, especially as the machine tool head rotates at high speeds.

It is another object of the invention to maintain full linear contact between the abutting edges of the cutter cartridge and the walls of the recessed portion of the machine tool head, to improve the stability and strength of the mounting arrangement.

It is also an object of the invention to provide easy access to the various adjustment and locking mechanisms.

A further object of the invention is to provide a locking mechanism to provide not only a stable cutter cartridge, but also to provide a sufficient range for displacement of the cutter cartridge to accurately and precisely locate the cutter cartridge at any of an extended number of locations.

Yet another object of the invention to provide precise, adjustment of a cutter cartridge in both an axial direction and in a radial direction in relation to the machine tool head.

BRIEF DESCRIPTIONS OF THE DRAWINGS

DETAILED DESCRIPTION OF EMBODIMENTS OF THE INVENTION

The invention relates to a machine tool cutter cartridge 20 that is adjusted by rotation of generally cylindrical adjustment pins 30, 50. The adjustment pins 30, 50 provide tangential contact between the cutter cartridge 20 and the machine tool head 21 along the entire length of the pins ("full linear contact").

Figure 1:
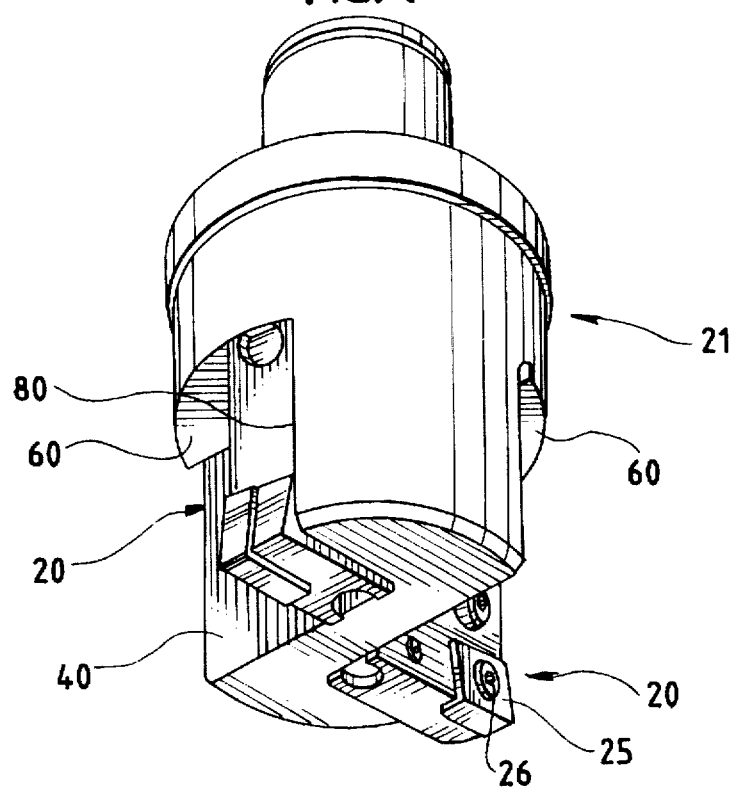
FIG. 1 is an isometric drawing of the preferred embodiment of the present invention mounted upon a machine tool head.
Figure 2:
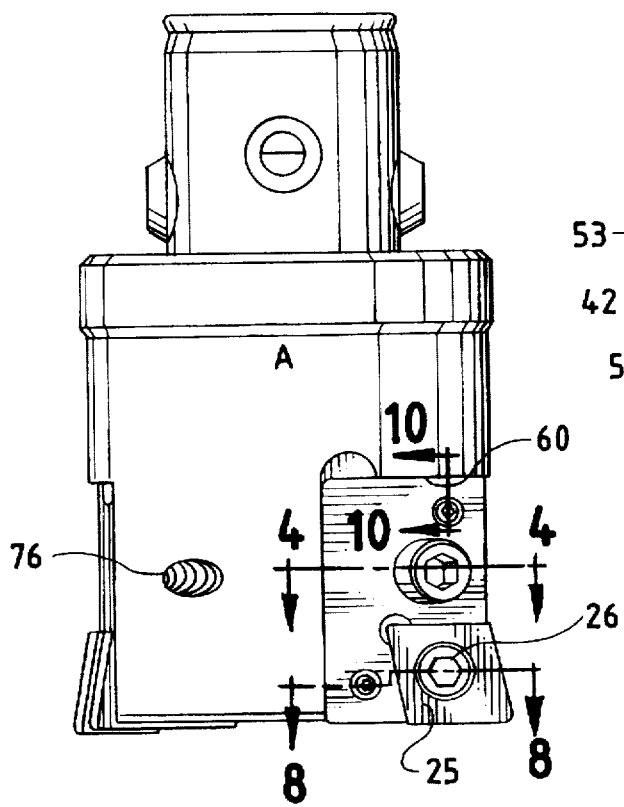
FIG. 2 is a side view of the invention mounted upon a machine tool head.
Figure 20:
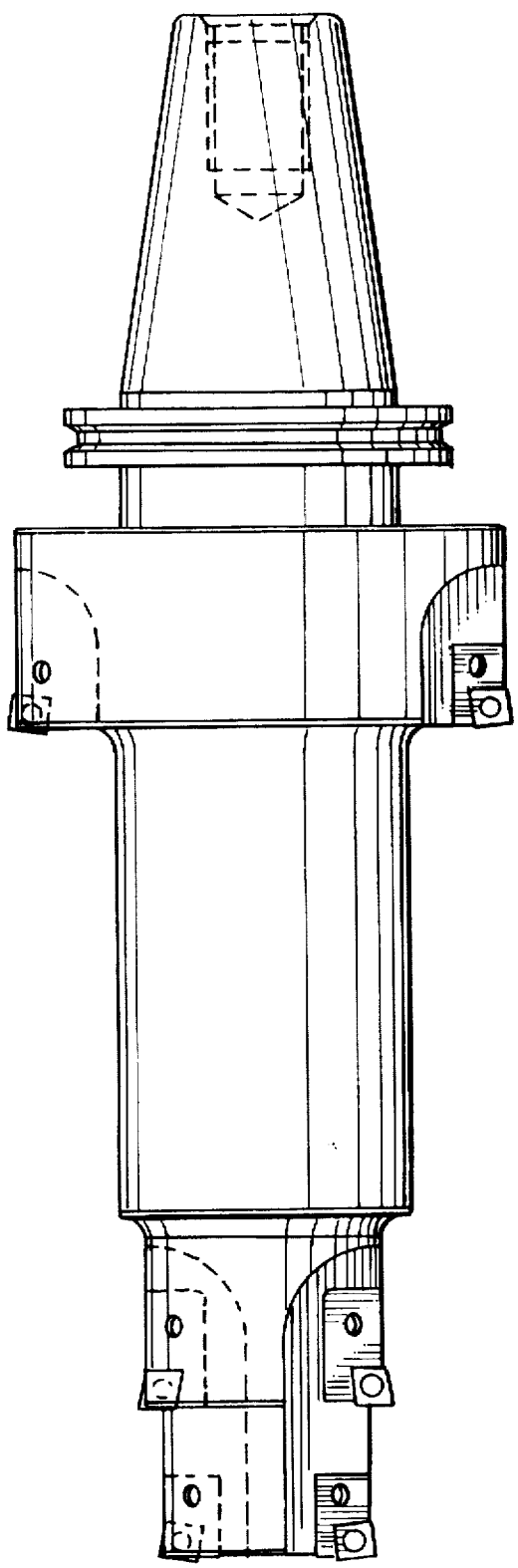
FIG. 20 is a side view of a machine tool head upon which several of the inventions may be placed in distally decreasing diameter.
Figure 21:
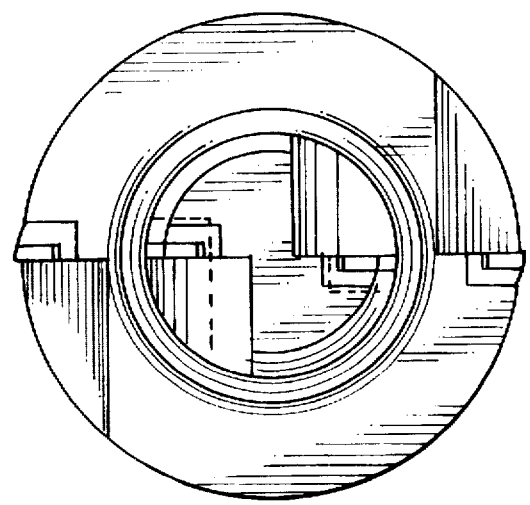
FIG. 21 is an end view of the machine tool head shown in FIG. 20.

As shown in FIGS. 1, 2, 20, and 21, the invention comprises a system for mounting a cutter cartridge 20 on a machine tool head 21. The cutter cartridge 20 comprises a cutting element 25 which is affixed, by a screw 26, to a mounting plate 27. The cutter cartridge 20 is nested in a recess 41 that is defined by mutually perpendicular walls 40, 60, and 80. The cutter cartridge 20 is removable from that recess 41. The invention may be mounted upon a single diameter machine tool head, as shown in FIG. 1, or on a machine tool head (such as a boring bar) on which multiple cutting tools are mounted in order to create various machined results such as chamfering, facing, or turning, as shown in FIGS. 20–21.

Figure 3:
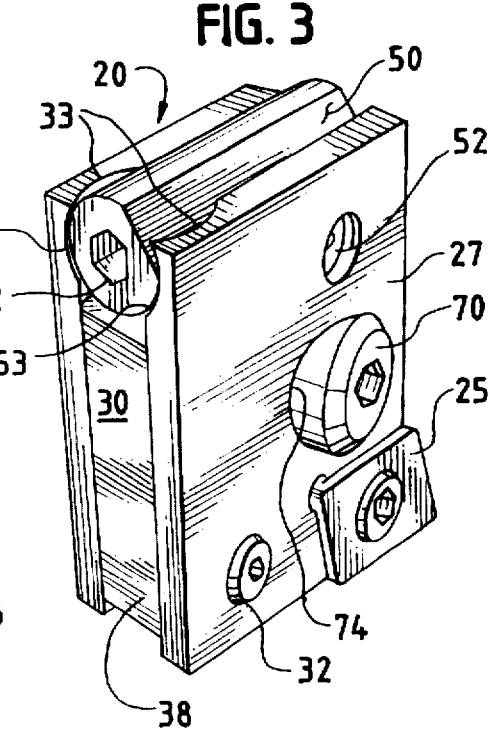
FIG. 3 is an isometric view of a cutter cartridge and associated parts.
Figure 4:
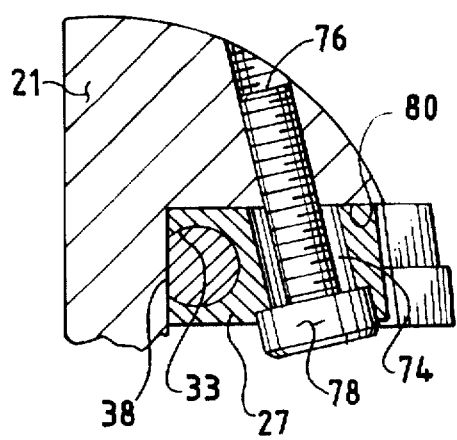
FIG. 4 is a cross-section of part of the present invention taken substantially in the plane of line 4—4 of FIG. 2.
Figure 11:
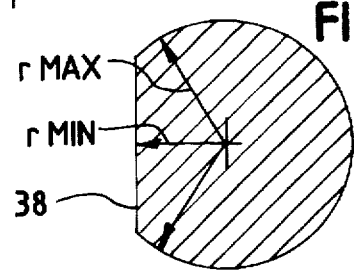
FIG. 11 is a cross-sectional view of an adjustment pin having a flat surface.
Figure 12:
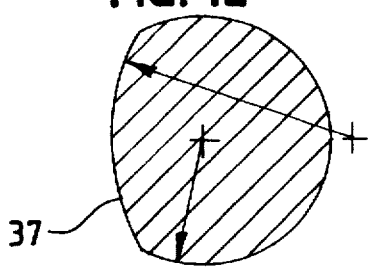
FIG. 12 is a cross-sectional view of an alternate form of an adjustment pin similar to that shown in FIG. 11, but in which the pin has a finite radius of curvature for each of its surfaces.
Figure 13:
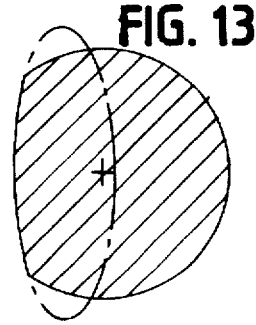
FIG. 13 is a cross-sectional view of an alternate form of an adjustment pin similar to that shown in FIG. 11, but in which one pin surface has an elliptical face.
Figure 14:
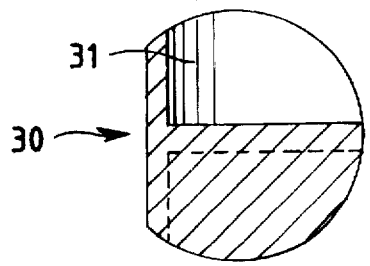
FIG. 14 is a cross-sectional view of a recessed portion of an adjustment pin.

In accordance with one aspect of the invention, the radial position of the cutter element 25 and mounting plate 27 can be adjusted through a limited range of motion relative to the head 21. To accomplish this, a radial adjustment pin 30 is carried in a groove 33 formed in the mounting plate 27, as shown in FIGS. 3–6. Pin 30 has a noncircular cross-section; that is, the distance from the pin center C to a pin surface S varies from $r_{min}$ to $r_{max}$, as shown in FIGS. 11–13. In one embodiment, the pin 30, as shown in FIGS. 3–4 and 11, has a flat surface 38. In other embodiments, the cross-section of the pin may be irregularly shaped, as in FIG. 12, or may be elliptical, as shown in FIG. 13.

Pin 30 abuts and engages a wall 40 that partly defines recess 41. When the pin 30 is positioned so that the flat surface 38 abuts the recessed wall 40, the mounting plate 27 and cutting element 25 are located as close as possible to the axis A of rotation of boring head 21. As pin 30 is rotated, the plate 27 and cutting element 25 are forced radially away from the machine tool head 21 by, for example, an amount X, as suggested in FIGS. 6 and 9.

Pin 30 maintains full linear contact with the recessed wall 40 of the machine tool head 21, allowing pin 30 to distribute the forces to which it is subjected, in contrast to the point-like contact of conventional tools.

Figure 6:
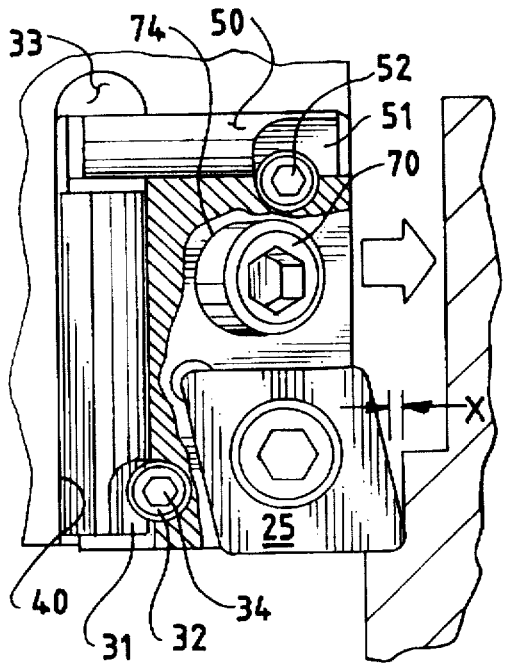
FIG. 6 is a view similar to FIG. 5 suggesting radial adjustment of the cutter cartridge.
Figure 7:
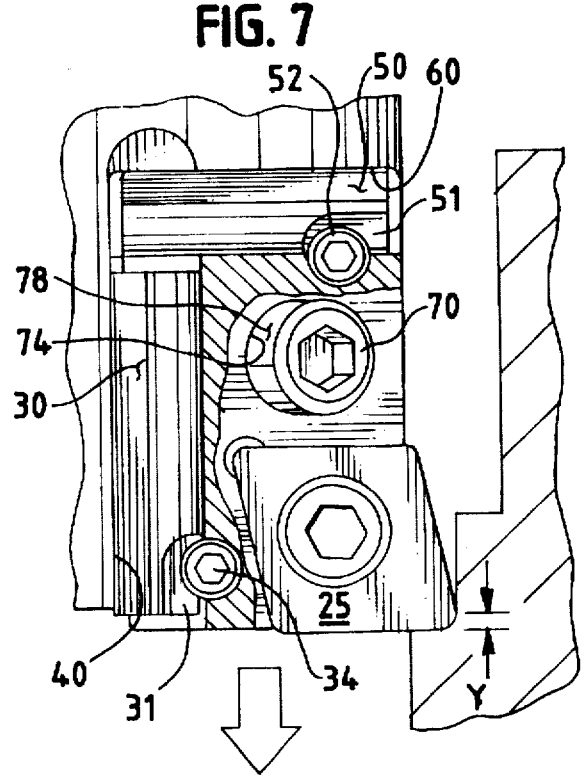
FIG. 7 is a view similar to FIG. 5 suggesting axial adjustment of the cutter cartridge.
Figure 8:
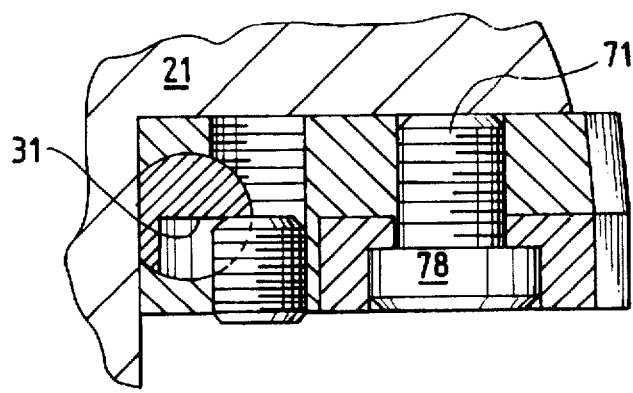
FIG. 8 is a cross-section of part of the present invention taken substantially in the plane of line 8—8 of FIG. 2.
Figure 9:
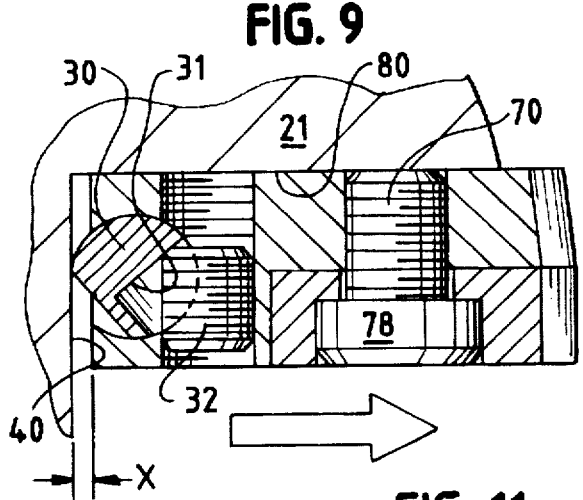
FIG. 9 is a view similar to FIG. 8 suggesting radial displacement of the cutter cartridge.

To rotate the pin 30, a set screw 32 is threaded into the front of the mounting plate 27, as shown in FIGS. 3, 6 and 9. The set screw is easily accessed on the front of the cutter cartridge 20. The set screw 32 engages a recessed portion 31 of the generally cylindrical adjustment pin 30, as illustrated in FIGS. 7–9. By rotating the set screw 32 and driving it inward, pin 30 rotates in the groove 33 and radially displaces the cutter cartridge 20, as shown in FIG. 9.

Figure 15:
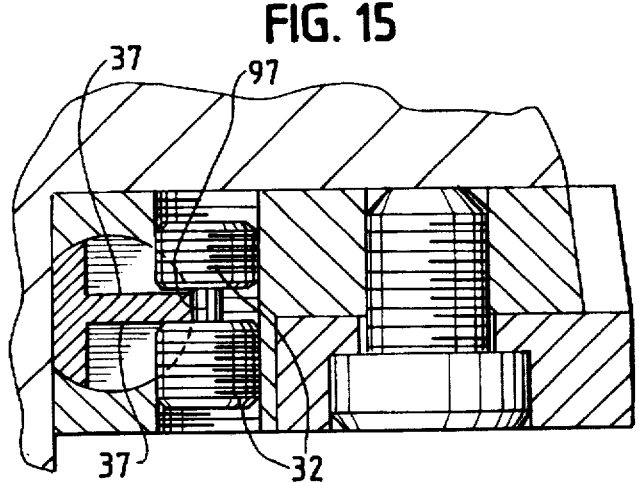
FIG. 15 is a view similar to FIG. 8 showing a relieved set screw where a web-like portion of the adjustment pin extends into the opposed pin reliefs.
Figure 16:
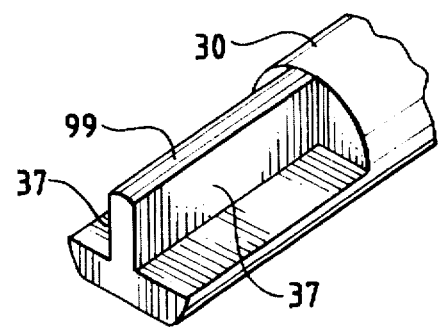
FIG. 16 is an isometric drawing of an adjustment pin having two recessed portions.

Several other embodiments of the set screw/adjustment pin assembly are possible. Each of these embodiments further secures the adjustment pin in the adjusted location. As shown in FIGS. 15–16, a first alternate embodiment of pin 30 contains two recesses 37 that permit the rotation of the pin to be varied using two set screws 32. The two set screws 32 are jointed by an articulation bar 97. The two recesses 37 form a wall 99. The leading edge of wall 99 engages the trailing edge of the first set screw 32 and the trailing of the wall 99 engages the leading edge of the second set screw 32. As the set screw 32 is rotated, the wall 99 is displaced, thus rotating the adjustment pin 30.

Figure 17:
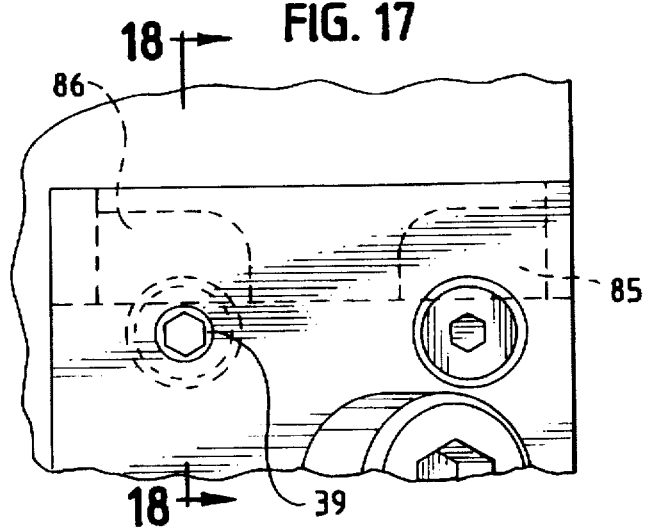
FIG. 17 is a fragmentary view similar to FIG. 7 in which the adjustment pin has two recessed portions located on opposite ends of the pin and on opposite sides of the central axis of the pin.
Figure 18:
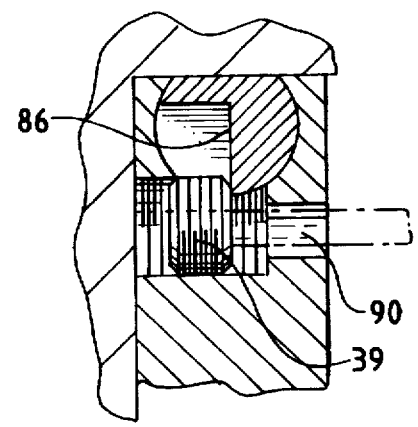
FIG. 18 is a cross-section of part of the present invention taken substantially in the plane of line 18—18 of FIG. 17.

Another embodiment of adjustment pin 30, shown in FIGS. 17–18, has two recessed portions 85, 86. The first recessed portion 85 is similar to recessed portion 31 in FIG. 7. The second recessed portion 86 occurs at the opposite end and opposite side of the central axis of the pin 30 from the first axis. As shown in FIG. 18, a second set screw 39 is threaded into the mounting plate 27. The second set screw 39 engages the second recessed portion 86, as shown in FIGS. 17–18. To access the second set screw 39, a channel 90 is formed in the mounting plate, as shown in FIG. 18. Thus, the second set screw 39 can be rotated in the same manner as the first set screw 32 from the same side of the central axis of the adjustment pin 30.

Figure 19:
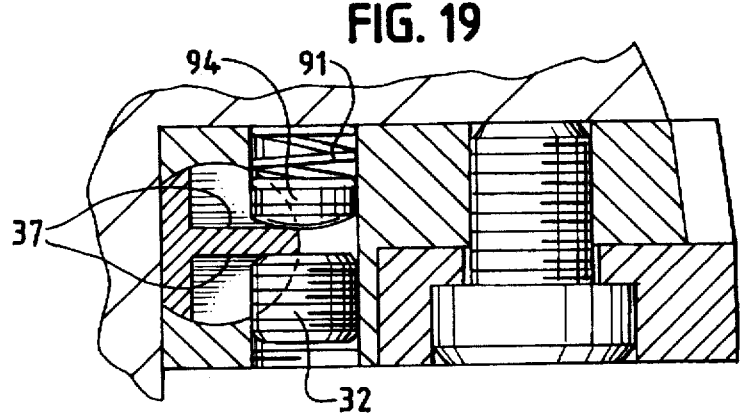
FIG. 19 is a view similar to FIG. 8 showing a set screw/adjustment pin assembly in which a non-recessed portion of the pin extends between a screw and a biasing assembly.

Still another embodiment of adjustment pin 30 is shown in FIG. 19, and has two recessed portions 37. One recessed portion 37 is engaged by a set screw 32, while the other recessed portion 37 is engaged by the leading edge of a cap 94. The trailing edge of the cap 94 engages the leading end of a spring 91. The trailing end of the spring 91 engages the recessed wall of the tool head 21.

The set screws 32, 39 can be rotated by hand, allen wrench, or other similar device. In one embodiment, shown in FIGS. 5–7, the head 34 of the set screw 32, 39 has a recessed end 36 to accommodate an allen wrench. In another embodiment, shown in FIG. 3, the pin 30 itself has a recess 42 which can receive an allen wrench for direct pin rotation; thus, no set screw device is required.

Figure 5:
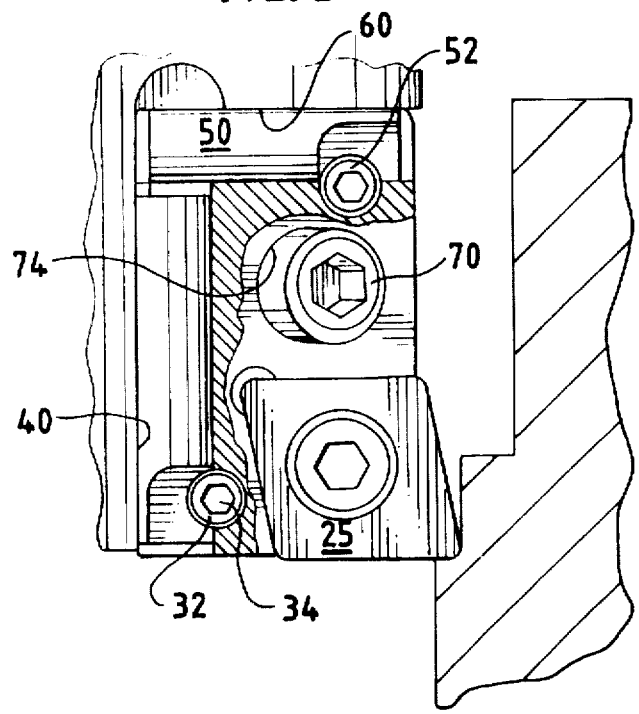
FIG. 5 is a fragmentary elevational view of the invention mounted upon a machine tool head showing the adjustment means in a partial section.
Figure 10:
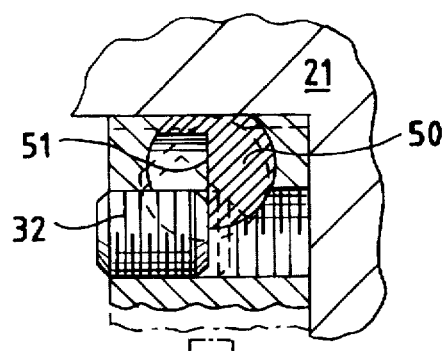
FIG. 10 is a cross-sectional view of the present invention taken substantially in the plane of line 10—10 of FIG. 2 showing axial adjustment of the cutter cartridge.

Axial adjustment of the cutter 20 is accomplished in a similar manner by using similar adjustment pins and set screws. Axial adjustment pin 50, similar to radial adjustment pin 30, is carried in a groove 53 found in the plate 27, as shown in FIG. 3. Pin 50 abuts and engages a wall 60 that defines a recessed portion of the bottom face of the bore head 21, as seen in FIGS. 1, 5 and 7. An axial set screw 52, similar to the radial set screw 32, abuts and engages a recessed portion 51 of adjustment pin 50. This set screw 52 is also easily accessed in its location on the front of the cutter cartridge 20 similar to the radial set screw 32. When the set screw 52 is rotated, it rotates the adjustment pin 50, which forces the cutter cartridge 20 axially away from the boring head 21, by a maximum amount Y, as suggested in FIGS. 7 and 10.

When the cutter cartridge 20 has been located axially and radially in the desired position, the cutter cartridge 20 is securely clamped to the boring head 21 by passing a locking screw 70 through an enlarged hole 74 in the mounting plate 27 and into a threaded hole 76 in the boring head 21. In order to better stabilize the locking mechanism, the axes of both threaded hole 76 and the enlarged hole 74 are oriented at either an obtuse or acute angle to the recess wall they penetrate. The locking screw 70 is easily accessed in its location either next to or in between the set screws 32, 52.

The radius of the threaded hole 76 equals the radius of the locking screw 70; the radius of the enlarged hole 74 in the mounting plate 27 exceeds the radius of the locking screw 70 to allow the desired range of plate motion. Rotating the screw 70 will engage the leading edge of the screw 70 with the threaded hole 76. At the same time, the head 78 of the screw will engage the outer surface of the mounting plate 27, thus locking the cutter 20 in the desired position.

The present invention has been described with respect to several variations of possible embodiments which are not meant to and should not be construed to limit the invention. Those skilled in the art will understand that variations from the embodiments and conditions described herein may be made without departing from the invention as claimed in the appended claims.

What is claimed is:

1. A cutter adjustment mechanism for a machine tool, comprising:

a tool head having a recess at least partly defined by at least one planar wall;

at least one means for cutting having at least one edge abutting a planar wall of the recess, adapted to be removably nested in the recess; and, means for adjusting the position of the cutting means relative to the planar wall, having a non-circular cross-section, so that the surface of the means for adjusting tangentially contacts the planar wall and biases the cutting means toward or from the planar wall as the means for adjusting is rotated.

2. The cutter adjustment mechanism of claim 1, wherein the means for adjusting comprises a pin.

3. A cutter adjustment mechanism of claim 1, wherein the non-circular cross section includes a substantially flat first portion.

4. The cutter adjustment mechanism of claim 1, wherein the means for adjusting includes a cross section including a first portion defined by a first radius of curvature and a second portion defined by a second radius of curvature that is different from the first radius of curvature.

5. The cutter adjustment mechanism of claim 1, wherein the means for adjusting includes a portion of the cross section that is substantially elliptical.

6. The cutter adjustment mechanism of claim 2, wherein said means for adjusting further comprises a set screw having a leading edge in contact with the pin, whereby rotation of the screw rotates the pin.

7. The cutter adjustment mechanism of claim 6, wherein the set screw is located on an exposed face of the means for cutting.

8. The cutter adjustment mechanism of claim 2, wherein the pin includes at least two recesses, each being partly defined by a wall;

two set screws, threaded through the cutter means;

the two set screws connected by an articulation bar;

the leading edge of one portion of one set screw confronting one edge of the wall, and the trailing edge of the other set screw confronting the opposite edge of the wall whereby rotation of one set screw rotates the pin.

9. The cutter adjustment mechanism of claim 8, wherein one said set screw is located on an exposed face of the means for cutting.

10. The cutter adjustment mechanism of claim 2, wherein said means for adjusting comprises a pin having two recesses, each being partly defined by a wall; a spring residing in a channel formed in the cutter means having its leading edge abutting the wall of one recess in the pin and its trailing edge confronting the tool head; and a set screw, threaded through the cutter means, and having a leading edge abutting the wall of the other pin recess, whereby rotation of the screw rotates the pin.

11. The cutter adjustment mechanism of claim 10, wherein the set screw is located on an exposed face of the means for cutting.

12. The cutter adjustment mechanism of claim 1, further comprising a locking mechanism wherein:

the means for cutting includes an oversized hole;

the tool head includes a threaded hole generally aligned with the oversized hole;

the axes of the oversized hole and the threaded hole extending at an acute or obtuse angle to the recess wall and to the corresponding abutting edge of the means for cutting; and a locking screw having a head and a shank extending through the oversized hole and into the means for cutting.

13. The cutter adjustment mechanism of claim 12, wherein the locking mechanism is located on an exposed face of the means for cutting.

* * * * *